United States Patent
Kim

(10) Patent No.: US 9,639,168 B2
(45) Date of Patent: May 2, 2017

(54) VEHICLE HAVING TOUCH RECOGNIZING FUNCTION, CONTROL METHOD THEREOF, AND NAVIGATION DEVICE

(71) Applicant: HYUNDAI MOTOR COMPANY, Seoul (KR)

(72) Inventor: Sung Un Kim, Yongin-si (KR)

(73) Assignee: Hyundai Motor Company, Seoul (KR)

( * ) Notice: Subject to any disclaimer, the term of this patent is extended or adjusted under 35 U.S.C. 154(b) by 9 days.

(21) Appl. No.: 14/727,692

(22) Filed: Jun. 1, 2015

(65) Prior Publication Data

US 2016/0154465 A1  Jun. 2, 2016

(30) Foreign Application Priority Data

Nov. 28, 2014  (KR) ........................ 10-2014-0167939

(51) Int. Cl.
| | |
|---|---|
| G06F 3/01 | (2006.01) |
| G06F 3/041 | (2006.01) |
| G06F 3/0488 | (2013.01) |
| G01C 21/36 | (2006.01) |

(52) U.S. Cl.
CPC ......... G06F 3/017 (2013.01); G01C 21/3664 (2013.01); G06F 3/0412 (2013.01); G06F 3/04883 (2013.01); G06F 3/04886 (2013.01); G06F 2203/04101 (2013.01); G06F 2203/04104 (2013.01); G06F 2203/04803 (2013.01); G06F 2203/04808 (2013.01)

(58) Field of Classification Search
CPC ......... G06F 3/041; G06F 3/0412; G06F 3/044
See application file for complete search history.

(56) References Cited

U.S. PATENT DOCUMENTS

2016/0005150 A1*  1/2016  Ghassabian ........... G06F 3/0488
                                                                            345/654

FOREIGN PATENT DOCUMENTS

| DE | 102012009384 | * | 11/2013 | ............. G06F 3/017 |
|---|---|---|---|---|
| JP | 2008-305083 A | | 12/2008 | |
| JP | 10-2009-0050109 A | | 5/2009 | |
| JP | 2010-176190 A | | 8/2010 | |
| JP | 2011-014044 A | | 1/2011 | |
| JP | 2014182602 | * | 9/2014 | ............. G06F 3/048 |
| JP | 2014182602 A | | 9/2014 | |

OTHER PUBLICATIONS

Office Action received Oct. 30, 2015 in related Korean application No. 10-2014-0167939, filed Nov. 28, 2014 (English Translation provided).

* cited by examiner

*Primary Examiner* — Olga Merkoulova
(74) *Attorney, Agent, or Firm* — McDermott Will & Emery LLP

(57) ABSTRACT

A vehicle having a touch recognition function includes a touch pad recognizing a writing signal in a touch form input by a user. A display displays a touch trace corresponding to the writing signal recognized by the touch pad. A controller is configured to calculate writing coordinates of the writing signal, to obtain a writing recognition load by analyzing a touch trace speed of the calculated writing coordinates, and to increase a processing priority of a writing recognition task among service tasks within the vehicle when the obtained writing recognition load is greater than or equal to a reference value.

16 Claims, 9 Drawing Sheets

VEHICLE HAVING TOUCH RECOGNIZING FUNCTION, CONTROL METHOD THEREOF, AND NAVIGATION DEVICE

CROSS-REFERENCE TO RELATED APPLICATION

This application claims the benefit of priority to Korean Patent Application No. 10-2014-0167939, filed on Nov. 28, 2014 in the Korean Intellectual Property Office, the disclosure of which is incorporated herein entirely by reference.

TECHNICAL FIELD

The present disclosure relates to a vehicle having a touch recognition function, a control method thereof, and a navigation device.

BACKGROUND

Various vehicle safety devices have been developed in consideration of convenience and safety of drivers of vehicles.

More specifically, the vehicle safety device may include a navigation device for guiding a route to a destination selected by a driver and peripheral information according to the route and a lane departure warning device for preventing the departure from a driving lane while assisting with a handling operation of a driver when the vehicle travels.

The above-described navigation device includes an audio device and a video device so that the driver may listen to music and view a video during driving in addition to providing route information.

A command is input to a touch pad to execute navigation within the vehicle. For example, the destination or the like may be input to the touch pad of the navigation device. It is necessary to display this information as a trace on a display as the information is input by the user. That is, it is necessary to display text input to the touch pad in real time so as to smoothly provide a service.

However, when various kinds of inputs including a multi-touch, in which the number of touch points on the touch pad is large, are performed, the amount of data is linearly increased by the number of touches and a speed. When a touch is made through a multi-touch trace, touch points are tracked and a tracking load exponentially increases.

In addition, when the touch pad is connected to a controller within the vehicle and a vehicle network, a network load for data processing of the touch pad increases and fixed resources may be expected to be excessively consumed.

Therefore, various methods for improving touch recognition performance while performing various service functions within the vehicle are being devised.

SUMMARY

An aspect of the present inventive concept provides a vehicle having a touch recognition function, a control method thereof, and a navigation device for improving performance of writing recognition of a touch pad within the vehicle.

In accordance with an exemplary embodiment of the present inventive concept, a vehicle having a touch recognition function includes a touch pad for recognizing a writing signal in a touch form input by a user. A display displays a touch trace corresponding to the writing signal recognized by the touch pad. A controller is configured to calculate writing coordinates of the writing signal, to obtain a writing recognition load by analyzing a touch trace speed of the calculated writing coordinates, and to increase a processing priority of a writing recognition task among service tasks within the vehicle when the obtained writing recognition load is greater than or equal to a reference value.

The controller may obtain the touch trace speed based on a distance of a sample touch point from a touch trace of the writing coordinates.

The controller may determine that the touch trace speed is proportional to the distance of the sample touch point.

The controller may obtain the touch trace speed based on a touch area in which the touch pad recognizes a touch.

The controller may obtain the touch area based on a touch point area of the writing coordinates and determine that the touch trace speed is higher when the obtained touch area is smaller.

The touch area may be an area of the touch pad in contact with a human body part such as a finger of a user or an area of the touch pad in contact with a tool of which a touch is recognizable on the touch pad.

When the touch trace speed is obtained based on each of a distance of a sample touch point and a touch area in contact with the touch pad from the touch trace of the writing signal, the controller may determine the touch trace speed based on the distance of the sample touch point.

When the writing recognition load is greater than or equal to the reference value, the controller may increase the processing priority of the writing recognition task so that the processing priority of the writing recognition task becomes higher than a processing priority of an essential service task within the vehicle.

When the writing recognition load is greater than or equal to the reference value, the controller may increase the processing priority of the writing recognition task by increasing a processing time or frequency of the writing recognition task.

When the writing recognition load is greater than or equal to the reference value, the controller may increase a sampling speed in the writing signal.

In accordance with another exemplary embodiment of the present inventive concept, a method of controlling a vehicle having a touch recognition function includes receiving a writing signal in a touch form input by a user through a touch pad. Writing coordinates of the writing signal is calculated. A writing recognition load is obtained by analyzing a touch trace speed of the calculated writing coordinates. A processing priority of a writing recognition task among service tasks within the vehicle is increased when the obtained writing recognition load is greater than or equal to a reference value.

The step of obtaining the writing recognition load may include obtaining the touch trace speed based on a distance of a sample touch point from a touch trace of the writing coordinates.

When the touch trace speed is obtained, the touch trace speed may be determined to be proportional to the distance of the sample touch point.

The step of obtaining the writing recognition load b may include obtaining the touch trace speed based on a touch area in which the touch pad recognizes a touch.

When the touch trace speed is determined, the touch area in contact with the touch pad may is obtained based on an area of a touch point of the writing coordinates and the touch trace speed is identified to be higher when the obtained touch area is smaller.

The step of increasing the processing priority o may include increasing the processing priority of the writing recognition task so that the processing priority of the writing recognition task is controlled to be higher than a processing priority of an essential service task within the vehicle.

The step of increasing the processing priority may include increasing the processing priority of the writing recognition task by increasing a processing time or frequency of the writing recognition task.

The method of controlling the vehicle having the touch recognition function may further include increasing a sampling speed in the writing signal when the writing recognition load is greater than or equal to the reference value before the processing priority of the writing recognition task increases after the writing recognition load is obtained.

In accordance with another exemplary embodiment of the present inventive concept, a navigation device includes a display for displaying a touch trace corresponding to a received writing signal when the writing signal input by a user is received from a touch pad. A controller is configured to calculate writing coordinates of the writing signal, to obtain a writing recognition load by analyzing a touch trace speed of the calculated writing coordinates, and to increase a processing priority of a writing recognition task among service tasks within the navigation device when the obtained writing recognition load is greater than or equal to a reference value.

The controller may obtain the touch trace speed based on a distance of a sample touch point from a touch trace of the writing coordinates.

The controller may obtain the touch trace speed based on a touch area in contact with the touch pad.

When the writing recognition load is greater than or equal to the reference value, the controller may increase the processing priority of the writing recognition task so that the processing priority of the writing recognition task is controlled to be higher than a processing priority of an essential service task within the navigation device.

Additional embodiments will be set forth in part in the description which follows and, in part, will be obvious from the description, or may be learned by practice of the disclosure.

According to the above-described embodiments, a process of a software module including a writing recognition task may be expected to be efficiently performed in a vehicle because it is determined whether a writing recognition load occurs by analyzing a touch trace speed of a writing signal input to a touch pad within the vehicle and a process of the writing recognition task is performed when the writing recognition load occurs.

In addition, data delay may be prevented when a writing trace corresponding to the writing signal recognized on the touch pad is displayed on a display.

BRIEF DESCRIPTION OF THE DRAWINGS

These and/or other aspects of the disclosure will become apparent and more readily appreciated from the following description of the embodiments, taken in conjunction with the accompanying drawings.

DETAILED DESCRIPTION

Figure 1:
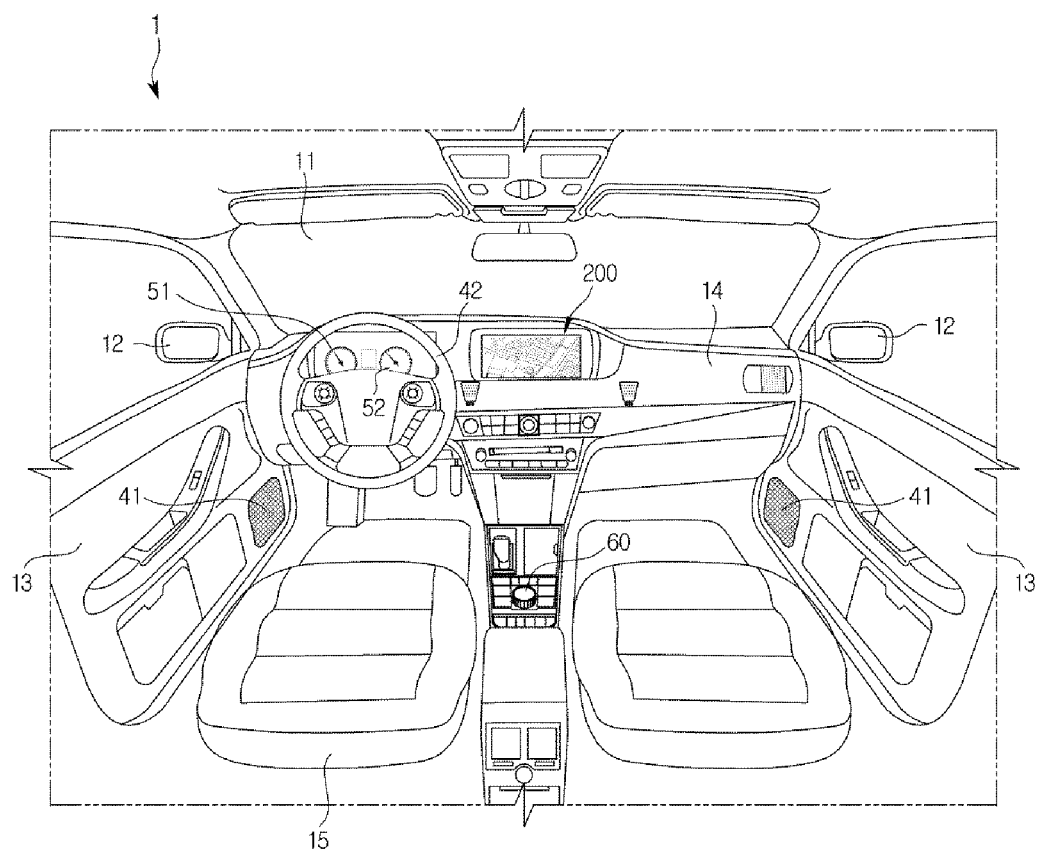
FIG. 1 is a diagram illustrating an interior of a vehicle.

Reference will now be made in detail to embodiments of the present inventive concept, examples of which are illustrated in the accompanying drawings, wherein like reference numerals refer to like elements throughout. Descriptions of well-known functions and constructions may be omitted for increased clarity and conciseness.

Hereinafter, exemplary embodiments of the present inventive concept will be described in detail with reference to the accompanying drawings.

FIG. 1 is a diagram illustrating an interior of a vehicle. Referring to FIG. 1, a vehicle 1 may include a dashboard 14 on which there are various devices for a driver to operate the vehicle 1, a driver's seat 15 on which the driver of the vehicle 1 sits, and cluster displays 51 and 52 for displaying operation information of the vehicle 1 and the like. A navigation device 200 provides audio and video functions as well as a route guide function for providing route guide information according to an operation command of the driver.

The dashboard 14 protrudes from a lower portion of a windshield 11 toward the driver and allows the driver to operate the various devices installed on the dashboard 14 while staring straight ahead.

The driver's seat 15 is disposed behind the dashboard 14, and the driver may drive the vehicle 1 while staring straight ahead and the various devices in a stable posture.

The cluster displays 51 and 52 are provided in the dashboard 14 near the driver's seat 15. The cluster displays 51 and 52 may include a driving speed gauge 51 for displaying a driving speed of the vehicle 1 and a revolutions per minute (RPM) gauge 52 for displaying an angular velocity of a power device (not illustrated).

The navigation device 200 may include a display for displaying information about a road on which the vehicle 1 travels or a route to a destination input by the driver. A speaker 41 outputs a sound according to the operation command of the driver. An audio/video/navigation (AVN) device in which an audio device, a video device, and a navigation device are integrated may be installed.

The navigation device 200 may be installed on a center fascia. The center fascia represents a control panel arranged between the driver's seat 15 and a passenger seat in the dashboard 14 and between the dashboard 14 and a gear stick. In the center fascia, an air conditioner, a heater controller, a ventilator, a cigarette lighter, an ashtray, a cup holder, and the like including the navigation device 200 may be installed. In addition, the driver's seat 15 and the passenger seat may be separated by the center fascia along with a center console.

In addition to the navigation device 200 of the driver, a separate jog dial 60 for various drive operations may be provided. A driving operation may be performed by rotating the jog dial 60 or applying a pressure to the jog dial 60. The jog dial 60 may be a touch pad having a touch recognition function of performing writing recognition for the drive operation using a user's finger or may be a tool having a separate touch recognition function.

In addition to the above-described configuration, the vehicle 1 may include a power device (not illustrated) for rotating wheels (not illustrated), a steering device (not illustrated) for changing a direction of movement of the vehicle 1, and a brake device (not illustrated) for stopping the movement of the wheels.

The power device provides a rotational force to front or rear wheels so that the vehicle 1 moves in a forward or backward direction. The power device may include an engine for generating the rotational force by burning a fossil fuel or a motor for receiving power from a capacitor (not illustrated) to generate the rotational force.

The steering device may include a steering handle 42, a steering gear (not illustrated) for converting rotary motion of the steering handle 42 to reciprocating motion, and a steering link (not illustrated) for transferring the reciprocating motion of the steering gear (not illustrated) to the front wheels. This steering device may change the driving direction of the vehicle 1 by changing a direction of a rotary shaft of the wheels.

The brake device may include a brake pedal (not illustrated) for receiving a brake operation from the driver, a brake drum (not illustrated) coupled to the wheels, and a brake shoe (not illustrated) for braking the rotation of the brake drum (not illustrated) using a frictional force. This brake device may stop the vehicle 1 by stopping the rotation of the wheels.

Figure 2:
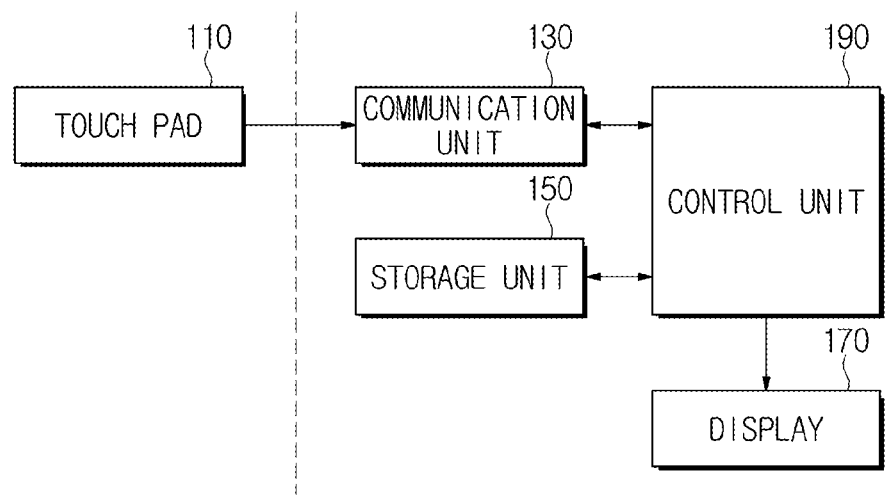
FIG. 2 is a control block diagram illustrating a configuration of the vehicle having a touch recognition function according to an embodiment.
Figure 3:
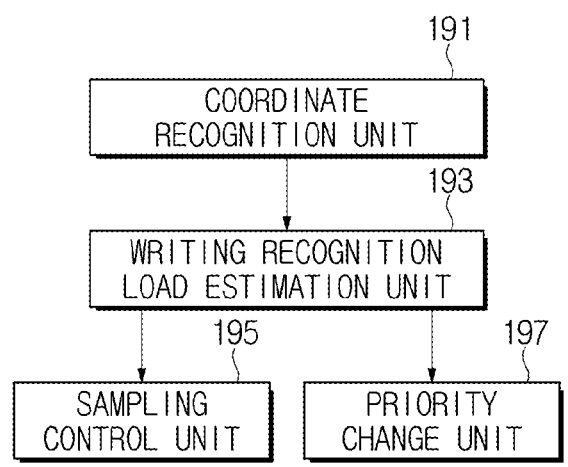
FIG. 3 is a control block diagram illustrating a configuration of a controller of FIG. 2.
Figure 4:
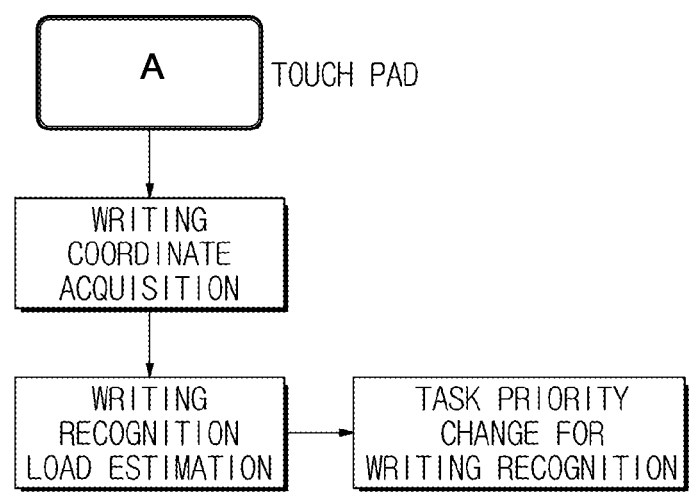
FIG. 4 is a diagram illustrating a method of changing a processing priority of a writing recognition task.
Figure 5:
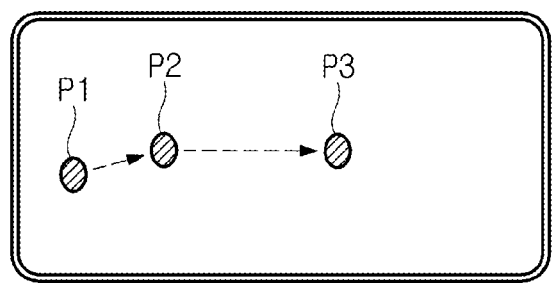
FIG. 5 is a diagram illustrating an example of a method of obtaining a speed of a writing trace.
Figure 6:
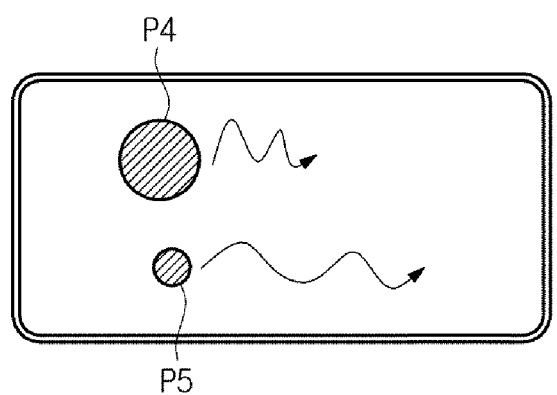
FIG. 6 is a diagram illustrating another example of the method of obtaining the speed of the writing trace.
Figure 7:
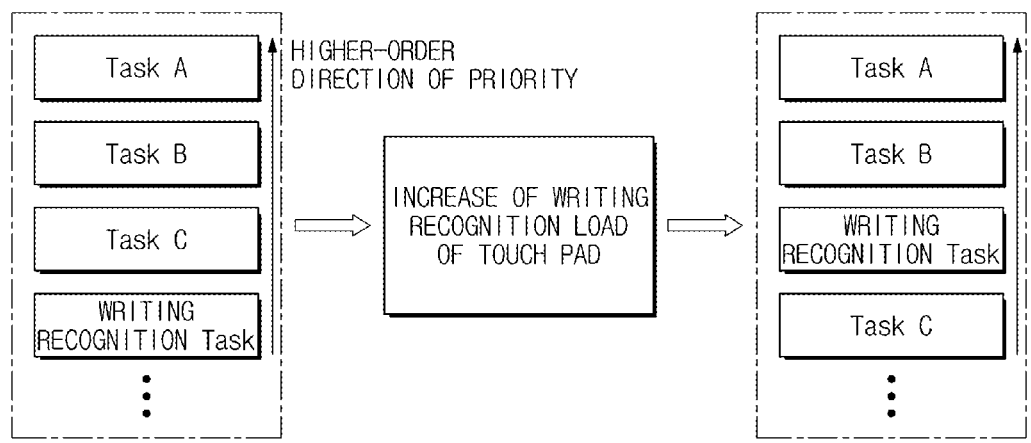
FIG. 7 is a diagram illustrating an example in which the processing priority of the writing recognition task is changed.

FIG. 2 is a control block diagram illustrating a configuration of the vehicle having the touch recognition function according to the embodiment. FIG. 3 is a control block diagram illustrating details of a configuration of a controller of FIG. 2. FIG. 4 illustrates a method of changing processing priority of a writing recognition task. FIG. 5 illustrates an example of a method of obtaining a speed of a writing trace. FIG. 6 illustrates another example of the method of obtaining the speed of the writing trace. FIG. 7 illustrates an example in which the processing priority of the writing recognition task is changed.

As illustrated in FIG. 2, the vehicle 100 may include a touch pad 110, a communicator 130, a storage 150, a display 170, and a controller 190.

The touch pad 110 may recognize a writing signal in a touch form input by the user. The touch pad 110 may be a touch pad provided in the jog dial 60 (see FIG. 1) or a display of the navigation device 200 having a touch recognition function. The present disclosure is not limited thereto. The touch pad 110 may include any touch pad having the touch recognition function within the vehicle 100.

If the display 170 has a touch function, it is possible to integrate the touch pad 110 and the display 170.

The communicator 130 may receive the writing signal transferred from the touch pad 110 for wire or wireless information transmission and reception within the vehicle 100.

The storage 150 may store a criterion for recognizing a writing signal transferred from the touch pad 110, a criterion for determining a writing recognition load, a criterion for changing processing priority of a service task within the vehicle 100, and the like to store various information related to the vehicle 100.

The display 170 may display a touch trace corresponding to the writing signal recognized by the touch pad 110, but is not limited thereto. The display 170 may display various information configured within the vehicle 100 so that the user may recognize the information.

The controller 190 may calculate writing coordinates of the writing signal, obtain a writing recognition load by analyzing a touch trace speed of the calculated writing coordinates, and increase processing priority of a writing recognition task among service tasks within the vehicle 100 when the obtained writing recognition load is greater than or equal to a reference value.

For example, as illustrated in FIG. 4, when the user writes 'A' on the touch pad 110, the controller 190 acquires writing coordinates, estimates whether the load has occurred in the writing recognition through the acquired writing coordinates, and changes processing priority of a task for the writing recognition to higher priority when the estimation result indicates that the writing recognition load has occurred.

The above-described service task within the vehicle may represent a unit of work in which an operating system (OS) within the vehicle 100 allocates resources and performs processing. For example, the task may include a service task for executing various functions of the navigation device 200 including audio and video functions as well as a road guide function, a writing recognition task for recognizing and displaying writing input by the user, a task for providing notifications of various types of alarms related to driving, and the like.

As illustrated in FIG. 3, the controller 190 may include a coordinate recognizer 191, a writing recognition load estimator 193, a sampling controller 195, and a priority changer 197.

The coordinate recognizer 191 may calculate writing coordinates of the writing signal transferred from the touch pad 110.

The writing recognition load estimator 193 may obtain a touch trace speed based on a distance of a sample touch point from the touch trace of the writing coordinates for obtaining the writing recognition load by analyzing a touch trace speed of the writing coordinates calculated by the coordinate recognizer 191. That is, the writing recognition load estimator 193 determines that the load has occurred in the writing recognition when the touch trace speed is greater than or equal to the reference value.

The recognition load estimator 193 may identify that the touch trace speed is proportional to the distance of the sample touch point. That is, the writing recognition load estimator 193 may identify that the touch trace speed is higher when the distance of the sample touch point is longer.

Referring to FIG. 5, the writing recognition load estimator 193 obtains distances between sample touch points such as P1, P2, and P3 and identifies that the touch trace speed is higher when the distance is longer. Because the distance between sample touch points P2 and P3 is greater than the distance between sample touch points P1 and P2, the writing recognition load estimator 193 may determine that the touch trace speed between P2 and P3 is higher.

In addition, the writing recognition load estimator 193 may obtain the touch trace speed based on a touch area in contact with the touch pad 110. The writing recognition load estimator 193 may obtain the touch area in contact with the touch pad based on a touch point area of the writing coordinates and identify that the touch trace speed is higher when the obtained touch area is smaller.

The touch area may be an area of the touch pad 110 in contact with a part of human body such as a finger of the user or an area of the touch pad 110 in contact with a tool of which a touch is recognizable.

Referring to FIG. 6, the writing recognition load estimator 193 determines that the touch trace speed is higher with respect to a touch area of P5 because the touch area of P5 is less than a touch area of P4. Since a force moving in the left or right direction is greater than a force pressing the touch pad 110 by hand when handwriting is made by finger, it is necessary to have a surface of the touch pad 110 with small friction when the user makes the writing.

When the touch trace speed is obtained based on each of the distance of the sample touch point from the touch trace of the writing signal and the touch area in contact with the touch pad, the writing recognition load estimator 193 may determine the touch trace speed based on the distance of the sample touch point.

When the writing recognition load is greater than or equal to the reference value, the sampling controller 195 may increase a sampling speed in the writing signal. That is, when the load has occurred in the writing recognition, the sampling controller 195 causes the writing trace to be displayed on the display 170 in real time by adjusting a sampling cycle of the writing signal to be shorter than in a current setting to increase the sampling speed.

When the writing recognition load obtained by the writing recognition load estimator 193 is greater than or equal to the reference value, the priority changer 197 may increase processing priority of a writing recognition task among service tasks within the vehicle 100.

Referring FIG. 7, priorities of service tasks within the vehicle are set in the order of Task A, Task B, Task C, and a writing recognition task. The priority changer 197 increases the priority of the writing recognition task when the increase in the writing recognition load is sensed. Here, a level to which the priority of the writing recognition task is changed may be set by an operator.

When the writing recognition load is greater than or equal to the reference value, the priority changer 197 increases processing priority of the writing recognition task so that the processing priority of the writing recognition task is controlled to be higher than the processing priority of an essential service task within the vehicle. The essential service task within the vehicle represents a service task such as a lane departure warning or an obstacle contact warning to be processed at top priority as compared to other service tasks in relation to safety within the vehicle 100.

For example, even after the priority change of the writing recognition task in FIG. 7, Task A and Task B having higher priorities than the writing recognition task may still be essential service tasks within the vehicle.

When the writing recognition load is greater than or equal to the reference value, the priority changer 197 may increase the processing priority of the writing recognition task by increasing a processing time or frequency of the writing recognition task.

Figure 8:
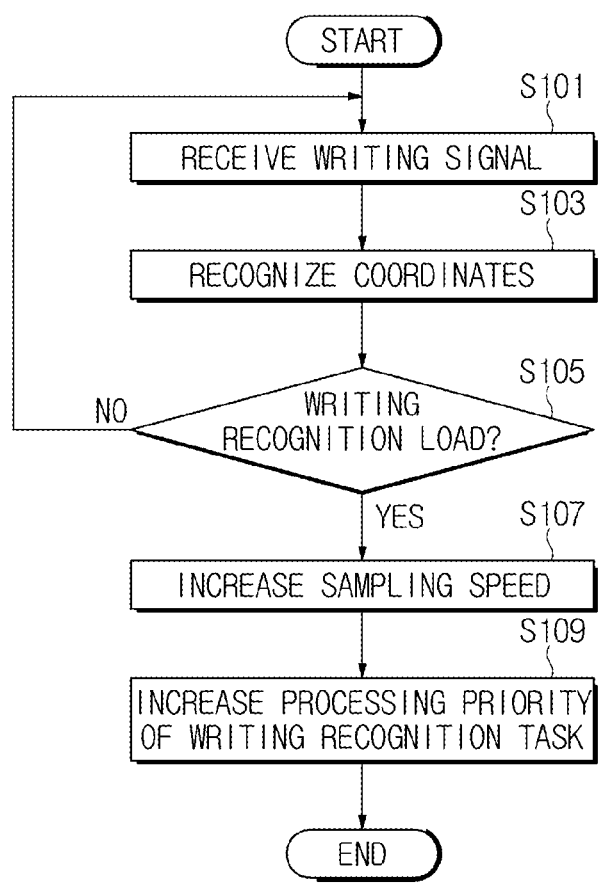
FIG. 8 is a flowchart illustrating a control method of a vehicle having a touch recognition function.

FIG. 8 is a flowchart illustrating a control method of a vehicle having a touch recognition function.

First, the vehicle 100 may receive a writing signal in a touch form input by the user through the touch pad 110 (S101). Then, Writing coordinates of the writing signal are calculated (S103). Next, a recognition load is obtained by analyzing a touch trace speed of the calculated writing coordinates (S105). At this time, it is determined whether the load has occurred in the writing recognition when the touch trace speed is greater than or equal to a reference value.

The touch trace speed is obtained based on a distance of a sample touch point from a touch trace of the writing coordinates. It is determined that the touch trace speed is proportional to the distance of the sample touch point. That is, it is determined that the touch trace speed is higher when the distance of the sample touch point is longer.

Referring to FIG. 5, distances between sample touch points are obtained, such as P1, P2, and P3, and it is determined that the touch trace speed is higher when the distance is longer. Because the distance between sample touch points P2 and P3 is greater than the distance between sample touch points P1 and P2, it is determined whether the touch trace speed between P2 and P3 is higher.

In addition, the touch trace speed is obtained based on a touch area in contact with the touch pad 110. At this time, the touch area in contact with the touch pad is obtained based on an area of a touch point of the writing coordinates and identify that the touch trace speed is higher when the obtained touch area is smaller. The touch area may be an area of the touch pad 110 in contact with a human body including a finger or an area of the touch pad 110 in contact with a tool of which a touch is recognizable.

Referring to FIG. 6, it is determined whether the touch trace speed is higher with respect to a touch area of P5 because the touch area of P5 is less than a touch area of P4.

When the touch trace speed is obtained based on each of the distance of the sample touch point from the touch trace of the writing signal and the touch area in contact with the touch pad 110, the touch trace speed is determined based on the distance of the sample touch point.

When the writing recognition load is greater than or equal to the reference value, a sampling speed in the writing signal may be increased (S107). That is, when the load has occurred in the writing recognition, the writing trace may be displayed on the display 170 in real time by adjusting a sampling cycle of the writing signal to be shorter than in a current setting to increase the sampling speed.

When the obtained writing recognition load is greater than or equal to the reference value, a processing priority of a writing recognition task among service tasks within the vehicle may be increased (S109). When the writing recognition load is greater than or equal to the reference value, the processing priority of the writing recognition task is increased so that the processing priority of the writing recognition task is higher than the processing priority of an essential service task within the vehicle. The essential service task within the vehicle represents a lane departure warning or an obstacle contact warning to be processed at top priority as compared to other service tasks in relation to safety within the vehicle 100.

In addition, when the writing recognition load is greater than or equal to the reference value, the processing priority of the writing recognition task is increased by increasing a processing time or frequency of the writing recognition task.

Figure 9:
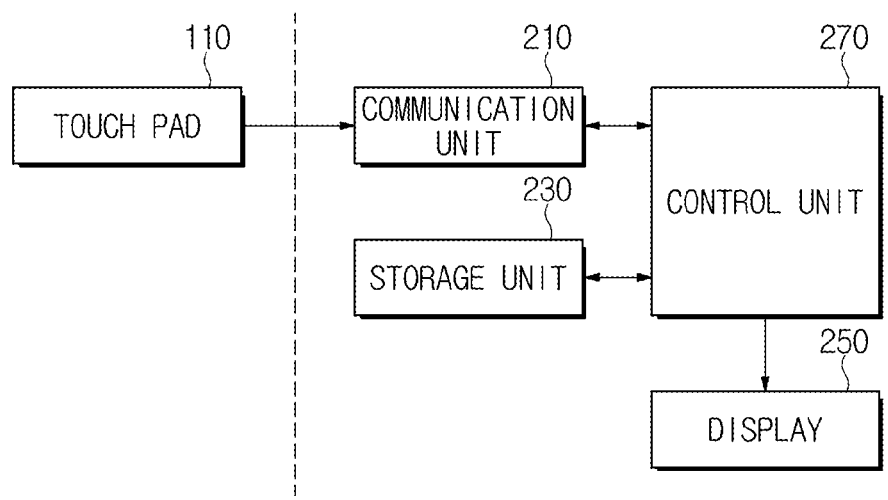
FIG. 9 is a control block diagram illustrating a configuration of a navigation device according to another embodiment.

FIG. 9 is a control block diagram illustrating details of a configuration of a navigation device according to another embodiment.

The navigation device 200 may include a communicator 210, a storage 230, a display 250, and a controller 270.

The communicator 210 may receive a writing signal transferred from the touch pad 110 by wired or wireless between the navigation device 200 and other components arranged within the vehicle 100.

The storage 230 may store a criterion for recognizing a writing signal transferred from the touch pad 110, a criterion for determining a writing recognition load, a criterion for changing a processing priority of a service task within the navigation device 200, and the like to store various information of the navigation device 200.

When the writing signal input by the user is received from the touch pad 110, the display 250 may display a touch trace corresponding to the received writing signal. In this case, when the display 250 has a touch recognition function, the touch pad 110 and the display 250 may be integrated.

The controller 270 may calculate writing coordinates of the writing signal, obtain a writing recognition load by analyzing a touch trace speed of the calculated writing coordinates, and increase a processing priority of a writing recognition task among service tasks within the navigation device 200 when the obtained writing recognition load is greater than or equal to a reference value. For example, because the processing priority of the writing recognition task is changed to a higher level when a destination input of the navigation device 200 is performed at a high speed, a touch trace display by the writing recognition of the touch pad 110 can be performed in real time on the display 250.

The controller 270 may obtain the touch trace speed based on the distance of the sample touch point from the touch trace of the writing coordinates.

Further, the controller 270 may obtain the touch trace speed based on the touch area in contact with the touch pad 110.

In addition, when the writing recognition load is greater than or equal to the reference value, the controller 270 increases the processing priority of the writing recognition task so that the processing priority of the writing recognition task is controlled to be higher than the processing priority of an essential service task within the navigation device 200.

According to the present disclosure, a controller may efficiently manage and operate a processor, and therefore, stability of a system within a vehicle may be ensured because the priority of a service task is changed by predicting the amount of data processing when a touch pad is used.

Moreover, a writing trace display can be smoothly performed on a display screen without any data delay.

Although embodiments of the present inventive concept have been shown and described, it would be appreciated by those skilled in the art that changes may be made in these embodiments without departing from the principles and spirit of the invention, the scope of which is defined in the claims and their equivalents.

What is claimed is:

1. A vehicle having a touch recognition function, the vehicle comprising:
 a touch pad for recognizing a writing signal in a touch form input by a user;
 a display for displaying a touch trace corresponding to the writing signal recognized by the touch pad; and
 a controller calculating writing coordinates of the writing signal, to obtain a writing recognition load by analyzing a touch trace speed of the calculated writing coordinates, and to increase a processing priority of a writing recognition task among service tasks within the vehicle when the obtained writing recognition load is greater than or equal to a reference value,
 wherein the controller obtains the touch trace speed based on a distance of a sample touch point from a touch trace of the writing coordinates, or obtains the touch trace speed based on a touch area in contact with the touch pad, and
 wherein the controller obtains the touch area in contact with the touch pad based on an area of a touch point of the writing coordinates, and identifies that the touch trace speed is higher when the obtained touch area is smaller.

2. The vehicle according to claim 1, wherein the controller determines that the touch trace speed is proportional to the distance of the sample touch point.

3. The vehicle according to claim 1, wherein the touch area is an area of the touch pad in contact with a human body part such as a finger or an area of the touch pad in contact with a tool of which the touch is recognizable on the touch pad.

4. The vehicle according to claim 1, wherein, when the touch trace speed is obtained based on the distance of the sample touch point and the touch area in which the touch pad recognizes a touch from the touch trace of the writing signal, the controller determines the touch trace speed based on the distance of the sample touch point.

5. The vehicle according to claim 1, wherein, when the writing recognition load is greater than or equal to the reference value, the controller increases the processing priority of the writing recognition task so that the processing priority of the writing recognition task becomes higher than a processing priority of an essential service task within the vehicle.

6. The vehicle according to claim 1, wherein, when the writing recognition load is greater than or equal to the reference value, the controller increases the processing priority of the writing recognition task by increasing a processing time or frequency of the writing recognition task.

7. The vehicle according to claim 1, wherein, when the writing recognition load is greater than or equal to the reference value, the controller increases a sampling speed in the writing signal.

8. The vehicle according to claim 1, further comprising:
 a communicator receiving the writing signal from the touch pad by wired or wirelessly; and
 a storage for storing a criterion for recognizing the writing signal, a criterion for determining the writing recognition load, and a criterion for changing the processing priority.

9. A method of controlling a vehicle having a touch recognition function, the method comprising steps of:
 receiving a writing signal in a touch form input by a user through a touch pad;
 calculating writing coordinates of the writing signal;
 obtaining a writing recognition load by analyzing a touch trace speed of the calculated writing coordinates; and
 increasing a processing priority of a writing recognition task among service tasks within the vehicle when the obtained writing recognition load is greater than or equal to a reference value,
 when in the obtaining of the writing recognition load by analyzing the touch trace speed of the calculated writing coordinates, the touch trace speed is identified based on a distance of a sample touch point from a touch trace of the writing coordinate, or is identified based on a touch area in contact with the touch pad, and
 when the touch trace speed is identified, the touch area in contact with the touch pad is obtained based on an area of a touch point of the writing coordinates, and the touch trace speed is identified to be higher when the obtained touch area is smaller.

10. The method according to claim 9, wherein, when the touch trace speed is obtained, the touch trace speed is determined to be proportional to the distance of the sample touch point.

11. The method of according to claim 9, wherein the step of increasing the processing priority includes:
 increasing the processing priority of the writing recognition task so that the processing priority of the writing recognition task becomes higher than a processing priority of an essential service task within the vehicle.

12. The method according to claim 9, wherein the step of increasing the processing priority includes:
increasing the processing priority of the writing recognition task by increasing a processing time or frequency of the writing recognition task.

13. The method according to claim 9, further comprising:
increasing a sampling speed in the writing signal when the writing recognition load is greater than or equal to the reference value before the processing priority of the writing recognition task increases when the writing recognition load is obtained.

14. A non-transitory computer-readable recording medium comprising computer executable instructions execution of which causes a controller to perform the method according to claim 9.

15. A navigation device comprising:
a display for displaying a touch trace corresponding to a received writing signal when the writing signal input by a user is received from a touch pad; and
a controller configured to calculate writing coordinates of the writing signal, to obtain a writing recognition load by analyzing a touch trace speed of the calculated writing coordinates, and to increase a processing priority of a writing recognition task among service tasks within the navigation device when the obtained writing recognition load is greater than or equal to a reference value,
wherein the controller obtains the touch trace speed based on a distance of a sample touch point from a touch trace of the writing coordinates, or obtains the touch trace speed based on a touch area in contact with the touch pad, and
wherein the controller obtains the touch area in contact with the touch pad based on an area of a touch point of the writing coordinates, and identifies that the touch trace speed is higher when the obtained touch area is smaller.

16. The navigation device according to claim 15, wherein, when the writing recognition load is greater than or equal to the reference value, the controller increases the processing priority of the writing recognition task so that the processing priority of the writing recognition task becomes higher than processing priority of an essential service task within the navigation device.

* * * * *